(12) United States Patent
Cheng et al.

(10) Patent No.: US 7,010,582 B1
(45) Date of Patent: Mar. 7, 2006

(54) SYSTEMS AND METHODS PROVIDING INTERACTIONS BETWEEN MULTIPLE SERVERS AND AN END USE DEVICE

(75) Inventors: Ray C. H. Cheng, Nepean (CA); Paul C. Van Oorschot, Ottawa (CA); Stephen William Hillier, Ottawa (CA)

(73) Assignee: Entrust Limited, Ottawa (CA)

( * ) Notice: Subject to any disclaimer, the term of this patent is extended or adjusted under 35 U.S.C. 154(b) by 952 days.

(21) Appl. No.: 09/603,356

(22) Filed: Jun. 26, 2000

(51) Int. Cl.
   *G06F 15/16* (2006.01)
(52) U.S. Cl. ..................................... 709/219
(58) Field of Classification Search ........ 709/217–219, 709/225, 227–229, 220–222; 713/201, 202, 713/183, 185; 705/64
   See application file for complete search history.

(56) References Cited

U.S. PATENT DOCUMENTS

| | | | | |
|---|---|---|---|---|
| 5,909,492 | A | | 6/1999 | Payne et al. .................. 705/78 |
| 5,960,411 | A | | 9/1999 | Hartman et al. .............. 705/26 |
| 6,049,785 | A | | 4/2000 | Gifford ........................ 705/39 |
| 6,275,941 | B1 | * | 8/2001 | Saito et al. .................. 713/201 |
| 6,401,125 | B1 | * | 6/2002 | Makarios et al. ........... 709/229 |
| 6,629,246 | B1 | * | 9/2003 | Gadi ............................ 713/202 |
| 6,892,307 | B1 | * | 5/2005 | Wood et al. ................. 713/201 |
| 2001/0054155 | A1 | * | 12/2001 | Hagan et al. ................ 713/193 |
| 2002/0010776 | A1 | * | 1/2002 | Lerner ........................ 709/225 |

FOREIGN PATENT DOCUMENTS

EP   1089516 A2 *  4/2001

OTHER PUBLICATIONS

M2 Presswire, "Encommerce: enCommerce Ships GetAccess 4.0; Advanced Portal Infrastructure Unites Global EBusiness Offerings Under One Brand," May 3, 2000, M2 Presswire, pp. 1-4.*

(Continued)

*Primary Examiner*—Dung C. Dinh
*Assistant Examiner*—Sean Reilly

(57) ABSTRACT

Methods and systems are provided which convey access control information from a first server to a second server through an end user device, for example in a system in which these servers and devices are all connected to the Internet. The method starts after the first server receives a message from the end user device. The first server in response to this message from the end user device sends a response message to the end user device containing the access control information to be conveyed to the second server, optionally after performing authentication. The response message also contains an instruction for the end user device to post a second message to the second server containing the information. The information is preferably contained in a content portion of the message. A hidden form may be used in the response message to contain the information. Optionally, the end user may be presented with an option to post the second message or not. This may allow conformance with data privacy laws requiring end user consent of data transfer. The instruction to post to the second server may consist of active content within the response message's content portion. This can be used to cause an end user device to store a cookie in association with a number of servers in different domains thereby implementing a multiple domain single sign-on function.

32 Claims, 6 Drawing Sheets

OTHER PUBLICATIONS

Carden, "The New Face of Single Sign-On," Mar. 22, 1999, Network Computing, vol. 10, Issue 6, pp. 32 ff.*
Ross, "ClearTrust Takes the Upper Hand in Web-Based Authentication," Jun. 12, 2000, Network Computing, vol. 11, Issue 11 pp. 58 ff.*
Borck, "ClearTrust Centralizes Security," Nov. 22, 1999, InfoWorld, vol. 21, Issue 47, pp. 37ff.*
RD 429128 A, Jan. 2000 IBM.*
McClure et al., "Microsoft and Novell Compete in Creating Single Internet Sign-On for Your E-Shopping," Nov. 15, 1999, InfoWorld, vol. 21, Issue 46, pp. 66ff.*
Samar, "Single Sign-On Using Cookies for Web Applications," Jun. 18, 1999, IEEE 8th International Workshops on Enabling Technologies: Infrastructure for Collaborative Enterprises, 1999, pp. 158-163.*
Parker, "Single Sign-On Systems—the Technologies and the Products," May 18, 1995, European Convention on Security and Detection, pp. 151-155.*
Trostle et al., "A Flexible Distributed Authorization Protocol," Feb. 23, 1996, Proceedings of the Symposium on Network and Distributed System Security, 1996, pp. 43-52.*
Jones, "NW6: Cross Webserver Authentication," Apr. 23, 1997, from www.crash.com/pubs/sans97nw6.pdf, pp. 1-31.*
Sars, "Unified Single Sign-On," Nov. 27, 1998, from www.tml.hut.fi/Opinnot/Tik-110.5.../papers/3singlesignon/singlesign-on, printout pp. 1-17.*
PR Newswire, "MSN Announces Strategy to Become the Web's Premier Marketplace," Mar. 4, 1999, PR Newswire, pp. 1ff.*
Microsoft, "Single Sign-On in Windows 2000 Networks," 1998, from www.microsoft.com/technet/prodtechno1/windows2000serv/evaluate/featfunc/nt2ksso.mspx, pp. 1-14.*
PR Newswire, "Microsoft Passport Offers Streamlined Purchasing Across Leading Web Sites," Oct. 11, 1999, PR Newswir pp. 1ff.*
Karpinski, "A Mediator For Personal Data," Aug. 23, 1999, InternetWeek, Iss. 778, p. 19.*
Kormann et al., "Risks of the Passport Single Signon Protocol," 2000, Computer Networks, Elsevier Science Press, vol. 33, pp. 51-58, printed from http://avirubin.com/passport.html.*
"E-wallets ease e-pain", The Globe and Mail, Friday, Jan. 28, 2000, Section E, pp. E1 and E11.
Digitalme Technical FAQ's, downloaded from web page http://www.digitalme.com/support/faq.html, printed on Aug. 30, 2000.
Microsoft Passport Member Services—What is Passport?, downloaded from web page http://memberservices.passport.com/HELP/MSRV_HELP_whatis.asp, printed on Aug. 30, 2000.
Persistant Client State HTTP Cookies, downloaded from web page http://www.netscape.com/newsref/std/cookie_spec.html, pinted on Aug. 30, 2000.
Risks of the Passport Single Signon Protocol, Computer Networks, Elsevier Science Press, vol. 33, pp. 51-58, date unknown, mid to late 2000, David P. Kormann and Aviel D. Rubin.

* cited by examiner

```
HEADER
60  set-cookie: <mdsso_cookie_name> =
    <mdsso_cookie_value>;expires<date>;  } 41
    path = /;domain = <domain_name>
    Location: http://www.domain_A.com/servlet/mdsso  ～ 43
                                                                            ⎫
                                                                            ⎬ 64
    <head>                                                                  ⎭
    <script language="javascript">
    function doMDSSO () {
        Document.forms [0].submit();
    }
    </script>
    </head>

CONTENT
62  <body language="javascript" onload="doMDSSO()" >                        ⎫ 69
    <form method="post" action="http://<next mdsso server name>/servlet/mdsso"name="mdsso" >
    <input type="hidden" name="<mdsso cookie name>" value = "<mdsso cookie value>" >    — 68
    <input type="hidden" name="homeserver" value = "<home server name>" >   — 70
    <input type="hidden" name="homeURL" value = "<homeURL>" >               — 72
    <input type="hidden" name="ServersVisited" value = "<list of servers>" >— 74
    </form>                                                                 ⎭
                                                                            66
```

FIG. 6

SYSTEMS AND METHODS PROVIDING INTERACTIONS BETWEEN MULTIPLE SERVERS AND AN END USE DEVICE

FIELD OF THE INVENTION

The invention relates to systems and methods which provide interactions between multiple servers and an end user device, for example for application to connectivity issues such as authentication.

BACKGROUND OF THE INVENTION

Client-side software, such as a web browser, uses some commonly agreed upon procedures to determine whether identifiers for any two servers, or network devices, are in the same network community called a domain (single domain). If they are not in the same domain, the two network devices are said to be in different domains (multiple domains).

For security purposes, servers which provide WWW (world wide web) content often require users to complete an authentication procedure before being provided access to a particular resource. After completion of such an authentication, the server sends the user's web browser one or more "cookies" which the browser then stores in a "cookie jar" for the particular domain. At a later time, if the user attempts to access the particular domain again, the web browser automatically forwards the cookies stored in the domain's cookie jar, and the server recognizes these cookies and does not require the user to re-authenticate. These cookies provide a pre-validated, sometimes time-limited ticket to access one or more protected web sites in a domain.

It is frequently the case that an organization or a group of participating organizations might provide service to users through multiple different domains, each of which have their respective authentication procedure which must be completed by a user. Disadvantageously, a user who completes the authentication procedure for a first domain who later visits a second of the multiple domains will need to complete a subsequent authentication procedure, and this is inconvenient to the user. It would be desirable to allow a user to authenticate within one domain, and then not need to re-authenticate in other related domains.

More generally, it may be desirable to communicate user-specific information, for example personal data and/or purchase enabling information pertaining to a user from one server to another. Communicating such information through direct server-to-server communications may be in violation of some countries' privacy laws. For example, sending credit card information, street address, telephone number, social security number, bank details, personal health information, taxation data, criminal records etc. from one server to another server directly without user consent may be a violation of privacy laws. Another approach is to send multiple secured emails to different sites with registration information. The information is sent in a non-validated one-way communication.

In the conventional use of a browser as master, data is acquired from a server. The browser may also "post" data to a server, e.g. when a user fills out a form, after which the browser delivers data to the server which provided the form. This does not provide a convenient way to transfer data between servers.

SUMMARY OF THE INVENTION

The invention, in accordance with one broad aspect, provides a method of conveying access control information, including but not limited to cookies, identification, authentication, authorization and privilege information from one network device to another network device through an end user device, for example in a system in which two servers and an end user device are all connected to the Internet, optionally after performing an authentication on an initial access request in the event the network device is the first accesses. The method starts after the one network device receives a message from the end user device. The one network device in response to this message from the end user device sends a response message to the end user device containing the access control information to be conveyed to the another network device. The response message also contains an instruction or instructions which cause the end user device to send a second message to the another network device containing at least part of the access control information. The access control information is preferably contained in a content portion of the response message.

In the event the method is being implemented by the first network device accessed by the end user, in which case the network device will be referred to as the "initial network device", the first message has a header portion and a content portion, and the access control information is contained in the header portion which is extracted for use in the response message.

In the event the method is being implemented by any other network device than the initial network device, the first message has a header portion and a content portion, and the access control information is contained in the content portion, and the method further involves extracting the access control information from the content portion for use in the response message.

Optionally, the response message is used to contain user-specific information together with instructions to include at least part of the user-specific information in the second message. When this is done, an option might be presented to the end user device to change and/or delete any of the user-specific information before sending the message to the another network device.

Preferably, each network device is further adapted to function as an initial network device. Such an initial network device is adapted to receive an initial access request from the end user device to access a protected resource on the initial network device, and to perform an authentication process to determine if access should be granted and if so, to respond with an access response message specifying the access control information in association with the domain of the initial network device and causing the end user device to send the first message. On an ongoing basis after this, subsequent access is allowed to the protected resource to requests containing the access control information.

The invention in accordance with another broad aspect provides a network device implemented method in which a network device responds to an initial access request with a redirect message instructing a redirection to a MDSSO (multi-domain single sign-on) function on the network device, the redirect message also specifying access control information in a header of the redirect message. The MDSSO function receives an input message having a header portion and a content portion, with the input message containing the access control information embedded within the header portion. The MDSSO function responds with a response message having a header portion and a content portion, with the response message containing the access control information in the header portion and having the content portion containing the access control information and also containing instructions to send a subsequent message to another network device on a different network domain, the subsequent message having a content portion containing at least part of the access control information.

Another broad aspect of the invention provides a network device having an authentication front end and an MDSSO function, the network device being adapted to provide initial network device functionality upon receipt of a request message containing access control information only in a header portion, and adapted to provide non-initial network device functionality upon receipt of a request message containing access control information in both a header portion and a content portion.

In providing the initial network device functionality, the authentication front end is adapted to process an initial access request message from an end user device to access a protected resource on the network device by performing an authentication process to determine if access should be granted and if so, responding with an access response message specifying an access control information in association with the domain of the network device and causing the end user device to send a first request message to an MDSSO (multiple domain single sign-on) function on the network device specifying the access control information in a header portion of the first request message. Also in providing the initial network device functionality, the MDSSO function is adapted to process a request message directed to it containing access control information only in a header portion by extracting the access control information from the header portion and sending to the end-user device a response message containing the access control information in a header portion and having a content portion containing the access control information and also containing instructions to send a subsequent request message to another network device on a different network domain, the subsequent message having a content portion containing the at least part of access control information.

In providing non-initial network device functionality, the MDSSO function is adapted to process a request message directed to it containing access control information in a content portion by extracting the access control information from the content and sending to the end-user device a response message containing the access control information in a header portion and having a content portion containing the access control information and also containing instructions to send a subsequent message to another network device on a different network domain, the subsequent message having a content portion containing at least part of the access control information.

A hidden form may be used in the response message and the second message to contain the information. Optionally, the end user may be presented with an option to send the second message or not. The instructions to send to the second network device may consist of custom content within the response message's content portion.

When an authentication function is also to be provided the network device performs authentication on an initial access request and then responds to the initial access request with a redirect message instructing a redirection to a multi-domain single sign-on function on the network device which is responsible for executing the steps of receiving an input message, extracting the cookie, and responding with a response message.

Since presumably the user wants to get back to the original network device it accessed, the method preferably redirects the user back to the original network device if there is no subsequent network device to be involved in the method. Another embodiment provides a multi-domain single sign-on system consisting of a group of network devices adapted to implement any of the methods described herein.

Advantageously, with any of the above methods the content and redirection information contained in the content portion of messages may be protected by cryptographic means as known in the art, for example through encryption, digital signature, message authentication codes, etc. the protection may be by way of a protected communication channel (e.g. Secure Socket Layer or Transport Layer Security as known in the art), or by protecting the data directly, independent of the communication channel.

In the event the HTTP/HTML environment is used, the various messages may be HTTP Request messages and HTTP Response messages.

The invention also provides a network device adapted to implement the above methods described herein, and an article of manufacture consisting of a computer usable medium having computer readable program code means embodied therein for implementing any of the methods described herein and a computer data signal embodied in a transmission medium having source code segments adapted to implement any of the methods described herein.

By using the content portion of messages to perform the above methods, great flexibility is realized. For example the content portion has no size restrictions in current implementations in contrast to the header portions which is typically size restricted. The content can be anything (e.g. HTML, Javascript, Java Applet). This provides opportunities for interpretation and intervention. A new content-type that can be interpreted by custom software at the client, or more user interaction via HTML/Javascript can be provided rather than passing things on invisibly.

More specifically, in one embodiment, information is put in the content portion to create custom content, which is then "interpreted" by new software at the browser which opens the custom content, processes it (e.g. via JavaScript) to determine the next server to visit, and visits the next server e.g. by sending a POST message. This is analogous to the "opening" of the content data and processing it to determine the server to visit (analogy: opening and reading a letter).

Using these methods the initial network device and any subsequent network device can serve as a point of validation (e.g. username/password) and may repackage information for a client to send to others.

It is noted that the information provided to an end user device by an initial network device may be a superset of the access control information contained in the response message at least a part of which is to be forwarded on to the subsequent network device. Thus there may be a first set of information provided to the end user device by the initial server some or all of which may relate to access control, all or a subset of which is to be forwarded to a subsequent network device, this subset functioning as the "access control information" for the purpose of this description.

Another broad aspect of the invention provides a method of conveying user-specific information from one network device to another network device on a different domain through an end user device. The method is very similar to the above described methods of circulating access-control information, and is preferably combined with those methods. In this method, the one network device in response to a first message received from the end user device containing user-specific information, sends a response message to the end user device containing the user-specific information, the response message being adapted to cause the end user device to send a second message to the another network device containing at least part of the user-specific information after presenting an option to the end user device to change and/or delete any of the user-specific information. The response message has a header portion and a content portion and the response message contains the user-specific information and a network device identifier for the another network device embedded within its content portion. The second message has a header portion and a content portion and the second message contains the at least part of the user-specific information embedded within its content portion.

BRIEF DESCRIPTION OF THE DRAWINGS

Preferred embodiments of the invention will now be described with reference to the attached drawings in which:

FIG. 6 is an example HTTP Response message used by the MDSSO server to redirect an end user device's browser to a subsequent MDSSO server;

DETAILED DESCRIPTION OF THE PREFERRED EMBODIMENTS

Figure 1:
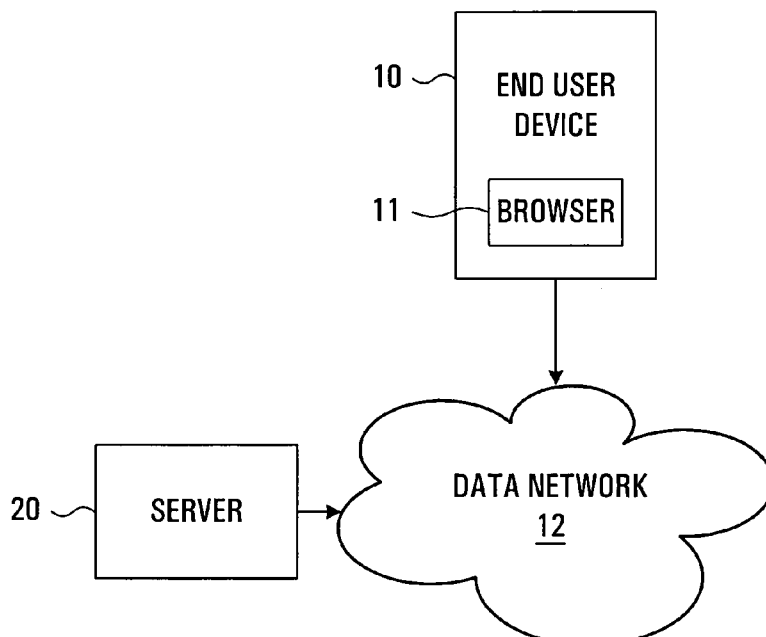
FIG. 1 is a block diagram of an example system employing an embodiment of the invention.

FIG. 1 is a block diagram of an embodiment of the invention used to provide a multiple domain single sign-on functionality. An end user device 10 is shown connected to a data network 12 (typically through a service provider, not shown) to which is also connected a number of MDSSO (multiple domain, single sign-on) servers 14, 16, 18 on different domains. The MDSSO servers 14, 16, 18 are servers which have been adapted to participate in a shared authentication process provided by this embodiment of the invention whereby after a user authenticates with a single one of the MDSSO servers, the user will subsequently be permitted access to any of the MDSSO servers without being required to re-authenticate. There would typically be other servers such as server 20 which are conventional servers not adapted to participate in the shared authentication process, or which might be part of another unrelated group of MDSSO servers. In the illustrated example, MDSSO servers 14, 16, 18 have domain names www.domain_A.com, www.domain_B.com and www.domain_C.com respectively. The set of domains for which this multiple domain, single sign-on is performed will be referred to as an MDSSO group. This typically will be a list of server domain names. Typically a single MDSSO cookie provides access to all the URLs of a domain (uniform resource locators). More generally each cookie can provide access to particular resources available at a network device.

The invention can be applied in the context of the Internet in which case the data network 12 is the Internet. More generally the data network 12 could be any suitable network over which the end user device 10 is to be connectable to the MDSSO servers 14, 16, 18, such as a WAN (wide area network) or LAN (local area network) for example. The end user device 10 is a device capable of connecting to and understanding the MDSSO servers 14, 16, 18 through the data network 12. For example, in the event the MDSSO servers 14, 16, 18 use HTTP/HTML, the end user device might be any device capable of understanding the HTTP protocol and of interpreting HTML. For example, it might be a personal computer equipped with a web browsing application (hereinafter browser), a mobile phone or some other Internet appliance.

In the example implementation described below, the assumption is made that the data network 12 is the Internet, and that HTTP is the protocol of choice with the end user device 10 being equipped with a browser 11.

Figure 2:
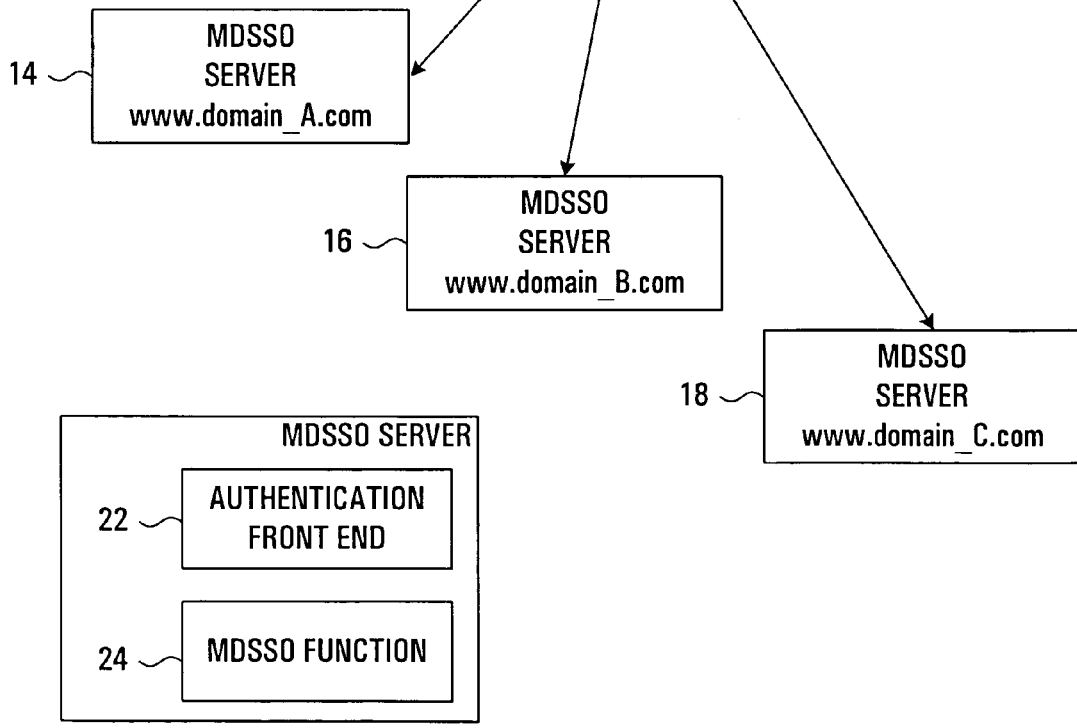
FIG. 2 is a block diagram of an MDSSO (multiple domain single sign-on) server of FIG. 1.

The details of the MDSSO servers 14, 16, 18 are shown in FIG. 2. Each MDSSO server has an authentication front end 22 and also has a MDSSO (multi-domain single sign-on) function 24.

Figure 3:
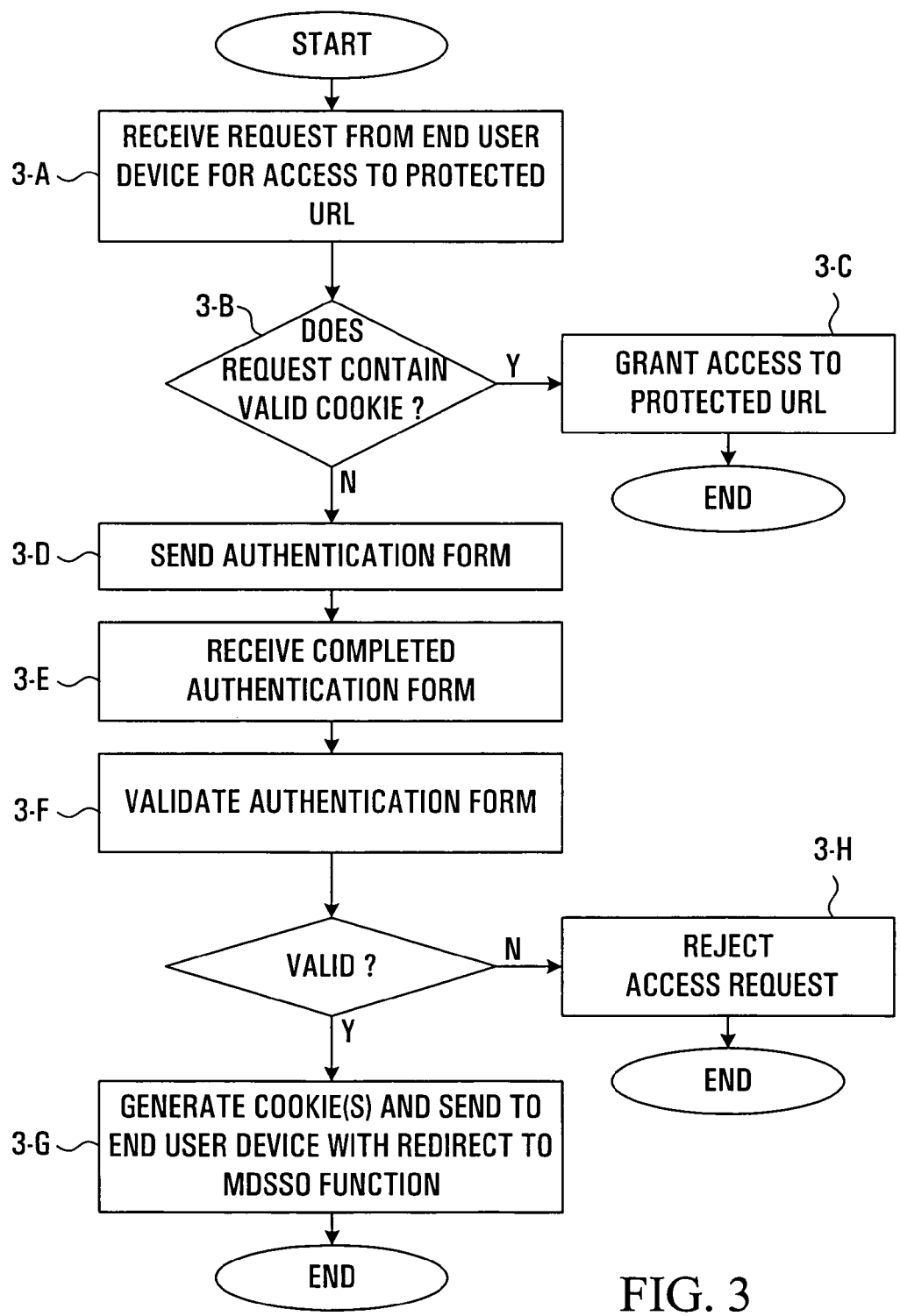
FIG. 3 is a flowchart of the functionality of the authentication front end of FIG. 2.

The purpose of the authentication front end 22 is to coordinate the collection and verification of authentication information from a user requesting access to the server or to a particular protected resource. The details of an example method which might be implemented by the authentication front end 22 will be described with reference to FIG. 3. Whenever a user requests to access a protected URL, the header of the request is checked by the authentication front end 22 for a valid cookie or cookies. If these are not present, the authentication front end 22 proceeds with an authentication process described below.

Typically, the authentication front end 22 receives initial requests, for example an HTTP Request, to access a protected URL (step 3-A). In the event the request contains valid cookies (Yes path, step 3-B) then access is granted to the protected URL (step 3-C). In the event the request contains no cookies or invalid cookies, the user is sent an authentication form to fill in (step 3-D). In response to this, the authentication front end 22 receives the completed authentication form (step 3-E), and does validation on the authentication information filled in by the user (step 3-F). If invalid, the access request is rejected (step 3-F).

Figures 4, 5:
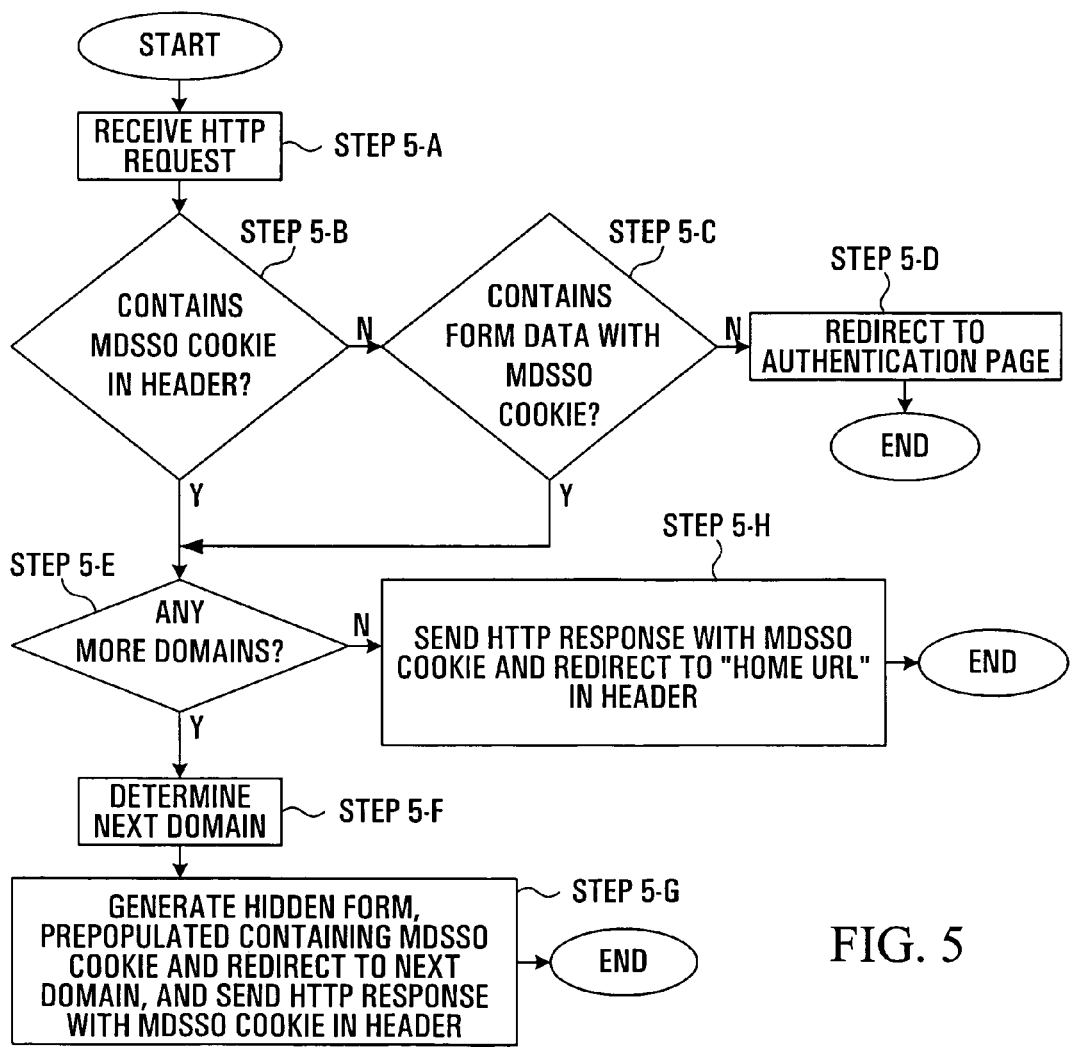
FIG. 4 is an example HTTP Response message used to redirect an end user device's browser to an MDSSO server.
FIG. 5 is a flowchart of the functionality of the MDSSO server of FIG. 2.

In conventional authentication systems, after successful authentication a cookie sent back to the users is typically accompanied by a redirect instruction to another page, typically the protected page that the user initially requested or a successful authentication page. According to this embodiment of the invention, the authentication front end 22, after successful validation, generates an MDSSO cookie and sends this back to the user in the header portion of a message which also redirects the user's browser to access the server's MDSSO function 24, for example in an HTTP Response message (step 3-G). When a browser, such as browser 11, receives the cookie, it stores it in association with the server domain name, and then includes it in any subsequent requests to that server. An MDSSO cookie is a cookie which is valid at each of the domains in the MDSSO group. An example of such a message is shown in FIG. 4 where it has been assumed that MDSSO server 14 with domain name www.domain_A.com received the request. The HTTP Response message has a header 40 and in this example an empty content portion 42. The header 40 specifies the MDSSO cookie 41, for example using the format:

Set-Cookie: <mdsso cookie name>=<mdsso cookie value>; expires<DATE>; path =/; domain =<domain name> to specify a cookie with some name, <mdsso cookie name> and to have a value <mdsso cookie value>. The cookie specifies the domain with which it is associated (<domain name>), and the cookie may also have an expiry date (DATE). The header also has a redirect 43 to the MDSSO function (more generally some network resource address), specified using the format:

"Location: http://www.domain_A.com/servlet/mdsso"

where the MDSSO function, named "mdsso" must be made accessible in the manner prescribed. After the generation of this message, the authentication front end's responsibilities are over. The MDSSO function 24 of each of the MDSSO servers is not a protected function/URL, so no authentication is performed when any one of the MDSSO functions 24 is subsequently accessed.

In the described implementation, forms are used in the authentication process. This is just one of many ways to authenticate. Others include entering a user name/password combination through a dialog, or client certificate authentication as known in the art, or through the use of a passcode from a one-time passcode generator. The MDSSO functionality is not affected by the form of authentication that is used. Furthermore, the MDSSO functions and methods on their own without any authentication are useful.

The functionality of the MDSSO function 24 will now be described in detail with reference to FIG. 6 and to the flowchart of FIG. 5. By way of overview, the MDSSO function 24 on each MDSSO server uses an HTTP Response message to cause the browser 11 to fill up its cookie jar for the server's domain and to direct the browser 11 to send a message having hidden content (data which is downloaded but not displayed to the user, for example hidden content in an HTML page) to the next domain in a sequence of domains. A preferred format for such an HTTP Response message is shown in FIG. 6. The message includes a header portion 60 and a content portion 62. The header portion 60 again specifies the MDSSO cookie using the format indicated above. The MDSSO cookie is used by the browser 11 to fill up its cookie jar for the domain responding. The content portion 62 is intended for processing by the browser 11. The content portion includes a client-side javascript 64 which is run when the HTML <body> is loaded by the client. An example of such a script 64 is shown in FIG. 6 and reproduced below:

<head>
<script language ="javascript">
function doMDSSO( ) {
document.forms[0].submit( );
}
</script>
</head>
<body language ="javascript" onload ="doMDSSO( )">

A hidden form 66 is also embedded in the content portion 62 with hidden values as shown in FIG. 6 and reproduced below:

<form method="post" action="<next server name>/servlet/mdsso" name="mdsso"
<input type ="hidden" name ="<mdsso cookie name>" value ="<mdsso cookie value>">
<input type ="hidden" name ="homeServer"value ="<home server name>">
<input type ="hidden" name ="homeURL" value ="<home URL>">
<input type ="hidden" name ="Servers Visited" value = "<list of servers>"
</form>

The form includes a line 68 specifying the MDSSO cookie name and MDSSO cookie value. The form includes a line 70 specifying the name of the home server. The home server is the server initially accessed by the user, and to which the user should be returned at the end of the process. The form includes a line 72 specifying the URL on the home server to which the user is to be directed at the end of the process. This is typically the first protected URL visited by the user or some sort of successful login page. The form includes a line 69 indicating the post action of the form, specifying the particular server (<next mdsso server name>) (more generally specifying a network device identifier—anything allowing a determination of where to send the message) to which the form is to be sent. The form may include a line 74 specifying the sequence of servers which have been visited thus far. While the content portion in the above description includes Javascript, any suitable form of embedded executable content may be used.

Referring now to FIG. 5, the MDSSO function 24 is activated upon receipt of a message, for example an HTTP Request message, directed to it (step 5-A). The first thing the MDSSO function 24 does is determine if the HTTP Request specifies a MDSSO cookie in its header (step 5-B). This will only be the case when the user's browser 11 is responding to the initial redirect from the authentication front end 22. In the event there is a MDSSO cookie, processing continues as described further below.

In the event there is no MDSSO cookie, the MDSSO function 24 processes the content portion of the HTTP Request if any (step 5-C). If there is no content portion, or if the content is invalid, a response containing a redirection to an authentication page is sent (step 5-D). Examination of the content field may involve decrypting the content field if encryption was employed.

In the event there was an MDSSO cookie in the header, or there was a content field containing a MDSSO cookie, the MDSSO function 24 identifies if there are any more domains to be included in the MDSSO (step 5-E). For example, the MDSSO function 24 might compare its own server name with the home server field in line 70 of the hidden form 66, and if these match, it will know that it is time to redirect to the home URL. If there is a further domain to visit, the MDSSO function 24 determines the next domain which is to participate in the MDSSO (step 5-F). The MDSSO function 24 then generates an HTTP Response with a header 60 and a content portion 62, the content being encrypted if appropriate. The header 60 contains the MDSSO cookie as received in the header, or as extracted from the content portion of the HTTP Request message. The domain name specified in the header specifies the server in the MDSSO group in association with which the MDSSO cookie is to be stored. The content includes the hidden form 66 specifying the next domain, and also contains the MDSSO cookie. The HTTP Response message thus generated is sent to the user (step 5-G). In the event the particular domain is the last domain to be processed (No path, step 5-E), the response header contains the MDSSO cookie and specifies the redirection to the original home URL (step 5-H).

Figure 7:
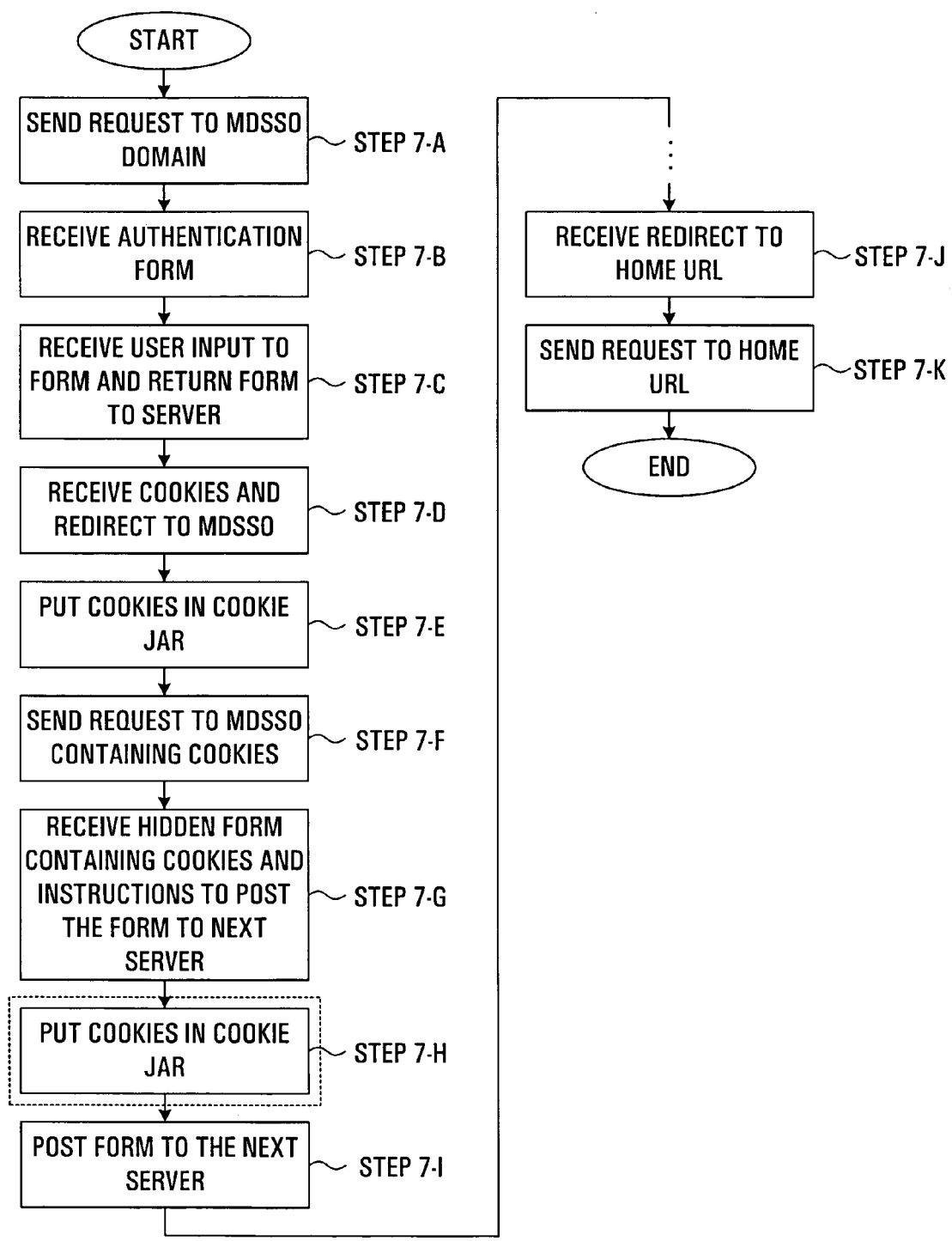
FIG. 7 is a flowchart of the steps executed at the browser in response to messages received from the MDSSO server.

The browser 11 is preferably a standard browser which is capable of processing HTTP Responses and generating HTTP Requests in accordance with accepted standards. The behaviour of the browser 11 is for the most part reactive, with the exception of the initial authentication and will now be described with reference to FIG. 7. The whole process is instigated when a user requests access to a protected resource on an initial MDSSO domain for the first time (or after the expiry of any cookies) (step 7-A). In response to this request, the browser 11 receives an authentication form which it presents to the user for completion (step 7-B) and which is then returned to the MDSSO server (step 7-C). Assuming successful authentication, the browser receives an HTTP Response message specifying an MDSSO cookie, and also redirecting the browser to access the MDSSO function (step 7-D) in the server. The browser 11 stores the MDSSO cookies in the cookie jar for the initial MDSSO server (step 7-E), and sends an HTTP Request to the MDSSO function on the MDSSO server in accordance with the redirect (step 7-F). Since the cookie jar for the MDSSO server contains cookies, these will be included in this HTTP Request. In response to this, the browser 11 will receive another HTTP Response containing a hidden form which includes the MDSSO cookies, and also containing instructions to post the hidden form to the next MDSSO server (step 7-G) which the browser then does (step 7-I). The sequence of steps of receiving a hidden form (step 7-G) and posting it to the next server (7-I) are repeated for each server. Each time a hidden form is received, the MDSSO cookies are specified, and the browser stores the MDSSO cookies in the cookie jar for the server from which the form was received (step 7-H). Of course, for the first hidden form which is received from the initial MDSSO server, these cookies will have been previously stored in the cookie jar for that domain. Eventually, a redirect to the home URL will be received (step 7-J) in response to which the browser 11 sends a request to the home URL (step 7-K) completing the process.

In the above example, the next server to be visited as specified in the content portion, must be known at the server presently being visited. More generally, any convenient mechanism for specifying a group, or sequence of MDSSO servers to be visited may be employed. Each MDSSO server might have locally stored information specifying a next server, or alternatively, the HTTP Request message it receives might either specify the next server or contain information allowing the next server to be identified.

One approach is to pre-store information at each server, specifying a "next server" in a virtual list. This approach might be more secure than the method identified below, but might make it harder to update the list and/or add server components.

Another approach is to include in the HTTP response messages generated by the MDSSO function an ordered list (e.g. domain_A, domain_B, domain_C) of servers to visit. A given server finds itself in the list, and causes the browser to visit the next server in list (sending list along). This approach can be enhanced by sending on only the un-used tail end of the list. This approach may prove better than the first approach for situations where the servers are not maintained by one company.

Server To Server Information Transfer

The above description has focussed upon an embodiment which provides an MDSSO solution. More generally, another embodiment of the invention provides a method for causing an end user device to visit a number of different communications devices, and optionally to transfer data across a series of communications devices (e.g. across a series of servers) without any direct server—server communication.

With this embodiment, HTTP (and other communications protocols) may be used to achieve the result of a browser communicating data among a series of servers. The data transferred between servers is in the content portion of the message may be selectively protected from exposure unlike the header.

This may be either done transparently to the end-user, or by presenting a choice to browser user of whether to allow use of the browser to perform this action. This choice can be presented via another browser window or dialog if for example Javascript is used. Optionally the capability to change data before sending can also be provided. The choice might depend on the application/data and other issues (i.e. privacy legislation, consumer trust, feeling of being in control from a consumer perspective).

Figure 8:
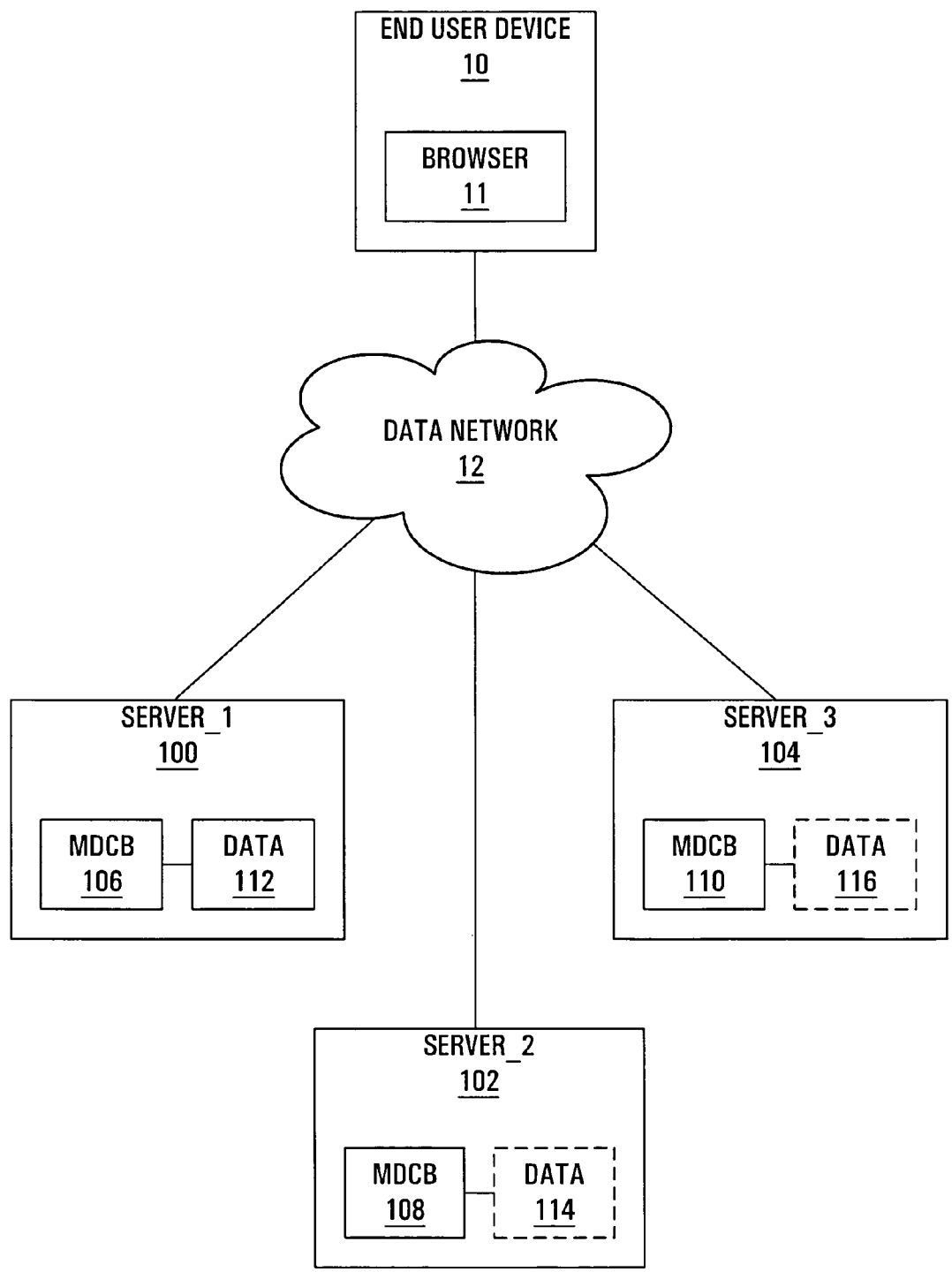
FIG. 8 is a block diagram of a system for implementing another embodiment of the invention.

An example is shown in FIG. 8 which is a network connectivity very similar to FIG. 1, showing three servers 100, 102, 104 connected to a data network 12 to which an end user device 10 running a browser 11 is also connected. The servers are labelled SERVER_1, SERVER_2, and SERVER_3. An authentication front end is not shown in each server 100, 102, 104 (although one might be present), and instead of an MDSSO function, each server is provided with a respective MDCB (multi-domain communications block) 106, 108, 110. Also shown in one of the servers 100 is a data source 112 from which the MDCB 106 on that server is capable of collecting data for transfer to other servers. Alternatively the data might be collected from a user which has accessed the server. The other servers may also have data sources 114, 116.

In order to transfer data from one server to another server in a different domain, an approach similar to the above described MDSSO is used. When the end user device 10 accesses SERVER_1, the MDCB sends a response message containing data which it wants to send to another server, for example SERVER_2, in the content portion of the message, and containing redirection instructions again in the content portion causing the browser to send a request message to SERVER_2 containing the data. The MDCB 108 on SERVER_2 is capable of extracting the data from the request. Data has thus been transferred from SERVER_1 100 to SERVER_2 102 without any direct contact between the servers. Of course, this could be continued to further servers, a chain of servers being identified using any convenient method such as any of the methods identified previously for MDSSO. Each time the MDCB returns the data to the browser, it might be the same data as from the previous server, or it might be modified data.

In effect, this embodiment of the invention provides a method to turn a master-slave protocol into slave-master, without changing the protocol. For example, it may use the existing HTTP protocol in a manner which makes the browser a slave to the server and follows server commands.

In the practical case of HTTP, a user can turn off the "browser as slave" functionality by disabling JavaScript, or using a setting whereby the user is prompted for approval before each cookie transfer. Alternatively, a new content type can be created and custom software developed to interpret the content. The advantage of this approach is that the developer would not be limited to available browser features and could provide a richer experience for the user. This may employ custom software.

The data being transferred between servers might for example be user-specific data. In this event, preferably, the end-user is given the opportunity to control which user-specific data is to be forwarded and to what servers.

The above described method and system of transferring data between servers is combinable with the previously described methods and systems of providing multiple domain single sign-on to provide a method and system by which multiple domain single sign-on and server-to-server data transfer of such user-specific information can be achieved simultaneously. In this case, the messaging would include both the access control information (such as the MDSSO cookie for example) and the user-specific information.

Register-Once-Shop-Anywhere Example

The following is an example implementation of the above embodiment which allows a user to register once at an online shop and then shop everywhere else in the same e-Mall (network of shops) without having to re-enter the same shipping/credit card information.

Assume four shops (Shop_1, Shop_2, Shop_3, Shop_4) join an E-mall and agree to share registration/shipping/credit card info, but do NOT want to share a common backend user database.

Step-by-Step Walk Through

1. The user visits www.shop_1.com and fills in registration information including authentication information and other user-specific information, for example shipping and credit card information (more generally any type of personal data and/or purchase enabling information).

2. The server validates the info and puts it in a hidden form (including user-specific information, if acceptable to users) all ready to send to the next server as described by the MDCB example above including the other sites in the E-Mall.

3. The user may be transparently redirected to the next site. Alternatively, instead of transparently re-directing the user to the next site, the user may be prompted with the choice to stop further forwarding, forward to remaining sites, or to select who to forward in remaining sites, and/or to control what user-specific information is forwarded on to other sites. This may be done with HTML/Javascript or with custom client side software.

Optionally, the redirect to the next server only happens upon successful registration at each server. Thus each server will have the opportunity to validate and request changes to the submitted information before passing it on. For example, a username/password may already be taken.

Preferably, some standard data format should be agreed upon to pass the information from site to site. Furthermore, preferably this passing of confidential information should be done in a secure fashion, by using some sort of cryptographic means for example. Each one of these servers may then store this information in its own backend database.

The following is an example of a Response message generated by a first server, Server_1, which gets an end user device involved in transferring two pieces of data (CreditCard number collected from user and CustomerLoyalty rating stored at Server 1) from the first server, to a second server, Server_2 with a POST.

HTTP/1.1 200 OK
Content-Type: text/html
Content-Length: <
<head>
<script language="javascript">
function doMDCB( ){
document.forms[0].submit( ):
}
</script>
</head>
<body language="javascript" onLoad="doMDCB( )">
<form method="post" action="http://www.server_2.com/mdcb" name="mdcb">
<input type="hidden" name="CreditCard" value="450012341234">
<input type="hidden" name="CustomerLoyalty" value="4">
<input type="hidden" name="homeServer" value="www.server_1.com">
<input type="hidden" name="homeURL" value="/CustomLogonPage">
</form>
</body>

Thus, the browser is used as an agent to deliver data (identical, or modified) from one server to another, with no direct server—server communications. For example: browser, server1, browser, server2, . . . , browser, server_n. (Optionally finish up at the browser also).

Numerous modifications and variations of the present invention are possible in light of the above teachings. It is therefore to be understood that within the scope of the appended claims, the invention may be practised otherwise than as specifically described herein.

For example, the invention has been described with reference to particular examples including examples using cookies. More generally, the invention can be used with any type of access control information, and not restricted specifically to cookies.

The invention has been described with reference to particular examples employing servers. More generally, any suitable network device may be used. Similarly, the invention has been described mainly with reference to end user devices equipped with web browsing functionality. More generally, any end user device adapted to have the required capabilities may be used. The servers and end user device might be connectable through the public Internet, and more generally through any IP based network, and more generally still through a network of any type.

An embodiment of the invention has been described with reference to providing secure access to URLs in different domains. More generally, the embodiments of the invention relating to security can be applied to providing secure access to any type of network resource, for example, data, physical devices, web sites, etc.

The invention claimed is:

1. A method of conveying access control information from one network device to another network device on a different domain through an end user device comprising:

the one network device in response to a first message received from the end user device containing access control information, sending a response message to the end user device containing the access control information, the response message being adapted to cause the end user device to send a second message to the another network device containing at least part of the access control information; and presenting an option to the end user device to send the second message or not, wherein at least part of the access control information is used to control access to a protected resource on at least one of the first and second network devices.

2. A method according to claim 1 wherein:

the response message has a header portion and a content portion and the response message contains the access control information and a network device identifier for the another network device embedded within its content portion;

the second message has a header portion and a content portion and the second message contains the at least part of the access control information embedded within its content portion.

3. A method according to claim 2 wherein the response message's content portion is formatted as a custom content type.

4. A method according to claim 2 wherein at least part of the content portion of the response message is protected by cryptographic means.

5. A method according to claim 2 wherein a hidden content is used in the response message to contain the access control information.

6. A method according to claim 1 wherein:
the first message has a header portion and a content portion, and the access control information is contained in the header portion, the method further comprising extracting the access control information from the header portion for use in the response message.

7. A method according to claim 1 wherein:
the first message has a header portion and a content portion, and the access control information is contained in the content portion, the method further comprising extracting the access control information from the content portion for use in the response message.

8. A method according to claim 1 wherein the fist message is an HTTP Request message, and the response message is an HTTP Response message.

9. A method according to claim 1 wherein the access control information is a cookie.

10. A network device adapted to implement the method of claim 1.

11. An article of manufacture comprising:
a computer usable medium having computer readable program code means embodied therein for implementing the method of claim 1.

12. A method of conveying access control information from one network device to another network device on a different domain through an end user device comprising:
the one network device in response to a first message received from the end user device containing access control information, sending a response message to the end user device containing the access control information, response message being adapted to cause the end user device to send a second message to the another network device containing at least part of the access control information;
containing user-specific information in the response message together with instructions to include at least part of the user-specific information in the second message; and
presenting an option to the end user device to change and/or delete any of the user-specific information before sending the message to the another network device,
wherein at least part of the access control information is used to control access to a protected resource on at least one of the first and second network devices.

13. A method of conveying access control information from one network device to another network device on a different domain through an end user device comprising:
the one network device in response to a first message received from the end user device containing access control information, sending a response message to the end user device containing the access control information, the response message being adapted to cause the end user device to send a second message to the another network device containing at least part of the access control information;
containing user-specific information in the response message together with instructions to include at least part of the user-specific information in the second message; and
presenting an option to the end user device to include or not include the at least part of the user-specific information in the second message,
wherein at least part of the access control information is used to control access to a protected resource on at least one of the first and second network devices.

14. A network device implemented method comprising:
a) a network device on a first network domain receiving an input message having a header portion and a content portion, with the input message containing an access control information embedded within the content portion;
b) the network device responding with a response message having a header portion and a content portion, with the response message containing the access control information in the header portion and having a content portion containing the access control information and also containing instructions to send a subsequent message to another network device on a different network domain, the subsequent message having a content portion containing at least part of the access control information.

15. A method according to claim 14 wherein the network device is an initial network device accessed by an end user device, the method further comprising:
prior to sending the response message,
a) the initial network device receiving an initial access request from the end user device to access a protected resource on the initial network device;
b) the initial network device performing an authentication process to determine if access should be granted and if so, responding with an access response message specifying the access control information in association with the first network domain and causing the end user device to send the input message; and
on an ongoing basis after performing the authentication process allowing subsequent access to the protected resource to requests containing the access control information.

16. A method according to claim 15 further comprising:
containing user-specific information in the response message together with instructions to include at least part of the user-specific information in the subsequent message.

17. A method according to claim 16 wherein the user-specific information comprises at least one of purchase enabling information and personal data.

18. A method according to claim 16 wherein at least part of the user-specific information is protected by cryptographic means.

19. A method according to claim 14 wherein the another network device is specified in the input message.

20. A method according to claim 14 wherein the another network device is specified by the network device.

21. A network device adapted to implement the method of claim 14.

22. A network device implemented method comprising:
the network device responding to an initial access request with a redirect message instructing a redirection to a MDSSO (multi-domain single sign-on) function on the network device, the redirect message also specifying an access control information in a header of the redirect message;

the MDSSO function receiving an input message having a header portion and a content portion, with the input message containing the access control information embedded within the header portion;

the MDSSO function responding with a response message having a header portion and a content portion, with the response message containing the access control information in the header portion and having the content portion containing the access control information and also containing instructions to send a subsequent message to another network device on a different network domain, the subsequent message having a content portion containing at least part of the access control information.

23. A method according to claim 22 further comprising performing an authentication process to determine if access should be granted, and if so responding to the initial access request message with the redirect message, and if not rejecting the initial access request.

24. A network device comprising an authentication front end and an MDSSO function, the network device being adapted to provide initial network device functionality upon receipt of a request message containing access control information only in a header portion, and adapted to provide non-initial network device functionality upon receipt of a request message containing access control information in both a header portion and a content portion;

wherein in providing the initial network device functionality:

a) the authentication front end is adapted to process an initial access request message from an end user device to access a protected resource on the network device by performing an authentication process to determine if access should be granted and if so, responding with an access response message specifying an access control information in association with the domain of the network device and causing the end user device to send a first request message to an MDSSO (multiple domain single sign-on) function on the network device specifying the access control information in a header portion of the first request message;

b) the MDSSO function is adapted to process a request message directed to it containing access control information only in a header portion by extracting the access control information from the header portion and sending to the end user device a response message containing the access control information in a header portion and having a content portion containing the access control information and also containing instructions to send a subsequent request message to another network device on a different network domain, the subsequent message having a content portion containing the at least part of access control information;

wherein in providing non-initial network device functionality:

c) the MDSSO function is adapted to process a request message directed to it containing access control information in a content portion by extracting the access control information from the content and sending to the end-user device a response message containing the access control information in a header portion and having a content portion containing the access control information and also containing instructions to send a subsequent message to another network device on a different network domain, the subsequent message having a content portion containing at least part of the access control information.

25. A multiple domain single sign-on system comprising a plurality of network devices according to claim 24.

26. The system of claim 25 wherein each of the plurality of network devices identifies a respective another network devices in the plurality of network devices.

27. The system of claim 25 wherein each response message identifies all remaining unvisited network devices in the plurality of network devices.

28. The system of claim 25 wherein each response message identifies all the network devices in the plurality of network devices.

29. An article of manufacture comprising:

a computer usable medium having computer readable program code means embodied therein for implementing a multiple domain single sign-on function, the computer readable code means in the article of manufacture comprising:

first computer readable code means adapted to receive in a first domain a first request message from a remote device, the first request message having a header portion and a content portion and containing an access control information embedded within the content portion, and to generate a response message having a header portion and a content portion, the header portion containing the access control information and the content portion containing the access control information and also containing instructions causing the remote device to access a network address in a different domain specified in the content portion with a subsequent message containing at least part of the access control information.

30. An article of manufacture according to claim 29 further comprising:

second computer readable code means adapted to receive an access request message from the remote device, to perform authentication, and to send instructions to the remote device to send the first request message to the first computer readable code means.

31. An article of manufacture according to claim 30 wherein the access control information is generated by the second computer readable code means, sent to the remote device with the instructions, and then received by the first computer readable code means in the first request message.

32. A method of conveying user-specific information from one network device to another network device on a different domain through an end user device comprising:

the one network device in response to a first message received from the end user device containing user-specific information, sending a response message to the end user device containing the user-specific information, the response message being adapted to cause the end user device to send a second message to the another network device containing at least part of the user-specific information after presenting an option to the end user device to change and/or delete any of the user-specific information;

wherein the response message has a header portion and a content portion and the response message contains the user-specific information and a network device identifier for the another network device embedded within its content portion;

the second message has a header portion and a content portion and the second message contains the at least part of the user-specific information embedded within its content portion.

* * * * *

UNITED STATES PATENT AND TRADEMARK OFFICE
CERTIFICATE OF CORRECTION

PATENT NO.         : 7,010,582 B1                              Page 1 of 1
APPLICATION NO.    : 09/603356
DATED              : March 7, 2006
INVENTOR(S)        : Ray C. H. Cheng et al.

It is certified that error appears in the above-identified patent and that said Letters Patent is hereby corrected as shown below:

Title page, Item [54] and Column 1, line 1,
Title, "...USE..." should be -- ...USER... --.

Column 2,
Between lines 36 and 37, insert the following paragraph:
-- In the event the method is being implemented by any other network device than the initial network device, the first message has a header portion and a content portion, and the access control information is contained in the content portion, and the method further involves extracting the access control information from the content portion for use in the response message. --.

Column 13,
Line 46, "..., response message..." should be -- ..., the response message... --.

Column 14,
Lines 8 to 10, "...user device to include or not include at least part of the user-specific information in the second message,..." should be -- ...user device to send the second message or not,... --.

Column 15,
Line 48, "...sending to the end user..." should be -- ...sending to the end-user... --.

Signed and Sealed this

Twenty-seventh Day of June, 2006

JON W. DUDAS
*Director of the United States Patent and Trademark Office*